United States Patent [19]

Kastl et al.

[11] Patent Number: 4,546,023

[45] Date of Patent: Oct. 8, 1985

[54] SMOKE-PERMEABLE FILM OF FIBER-REINFORCED REGENERATED CELLULOSE FOR PRODUCING TUBULAR CASINGS, IN PARTICULAR SAUSAGE CASINGS

[75] Inventors: Erna Kastl, Taunusstein; Klenk Ludwig, Oestrich-Winkel; Horst Faust, Wiesbaden, all of Fed. Rep. of Germany

[73] Assignee: Hoechst Aktiengesellschaft, Frankfurt am Main, Fed. Rep. of Germany

[21] Appl. No.: 636,495

[22] Filed: Aug. 1, 1984

[30] Foreign Application Priority Data

Aug. 3, 1983 [DE] Fed. Rep. of Germany ....... 3328050

[51] Int. Cl.[4] ...................... F16L 11/00; A22C 13/00
[52] U.S. Cl. .................................. 428/36; 138/118.1; 426/105; 426/135; 426/140
[58] Field of Search ...................... 428/36; 138/118.1; 426/105, 135, 140

[56] References Cited

U.S. PATENT DOCUMENTS

| | | | |
|---|---|---|---|
| 2,096,221 | 10/1937 | Atkinson | 138/118.1 |
| 2,207,793 | 7/1940 | Freeman | 138/118.1 |
| 2,819,488 | 1/1958 | Gimbel | 17/42 |
| 3,594,857 | 7/1971 | Michl | 17/42 |
| 3,619,854 | 11/1971 | Ilgen et al. | 17/42 |
| 3,766,603 | 10/1973 | Urbutis et al. | 17/42 |
| 4,116,162 | 9/1978 | Dinter et al. | 118/104 |
| 4,356,200 | 10/1982 | Hammer et al. | 428/36 |
| 4,396,039 | 8/1983 | Klenk et al. | 138/118.1 |
| 4,399,839 | 8/1983 | Hutsheneuter | 428/36 |
| 4,401,135 | 8/1983 | Andrä et al. | 138/118.1 |
| 4,401,136 | 8/1983 | Porrmann | 428/36 |

*Primary Examiner*—John E. Kittle
*Assistant Examiner*—James J. Seidleck
*Attorney, Agent, or Firm*—Schwartz, Jeffery, Schwaab, Mack, Blumenthal & Evans

[57] ABSTRACT

Disclosed is a smoke-permeable film suitable for the production of tubular casings, especially sausage casings, including a film of fiber-reinforced regenerated cellulose and a layer of thermoplastic sealable resin containing a vinylidene group-containing copolymer. The thermoplastic sealable resin has a smoke-permeable structure, including linear discontinuities running parallel to one another, and is anchored to the surface of the cellulose film with the aid of an adhesion promoting layer. The resin layer completely coats at least one of two surfaces of the cellulose film. Also disclosed is a casing made of the smoke-permeable film and a method for producing the film.

36 Claims, No Drawings

SMOKE-PERMEABLE FILM OF FIBER-REINFORCED REGENERATED CELLULOSE FOR PRODUCING TUBULAR CASINGS, IN PARTICULAR SAUSAGE CASINGS

BACKGROUND OF THE INVENTION

The present invention relates to a smoke-permeable film of fiber-reinforced regenerated cellulose coated with a layer of a thermoplastic sealable resin, in particular a vinylidene group-containing copolymer, with a smoke-permeable structure, which layer is, if necessary, anchored to the film surface with the aid of an adhesion-promoting layer. This film is suitable for the production of tubular casings, particularly sausage casings, with a sealed or sewn seam running along the longitudinal axis. The invention further relates to a process for producing the film and to a tubular casing, in particular a sausage casing, produced from the film and having a sealed or sewn seam running along the longitudinal axis.

U.S. Pat. No. 4,396,039 discloses a tubular casing, particularly a sausage casing, which is produced from a film web of the kind described above by shaping the film web into a tube and gluing the overlapped edge regions.

Apart from a great number of other possibilities, the adhesive layer described in the published U.S. patent can, for example, also be a sealable layer of a thermoplastic, vinylidene group-containing polymer which is anchored on the surface of the film web by means of a water-insoluble adhesion-promoting resin. Since the known casing is particularly intended for sausages, which are to be smoked, emulsion type sausages and dry sausages, the adhesive layer, which forms a water- and smoke-impermeable film, can only be applied to the seam zones. The publication proposes various methods of imparting satisfactory permeability to smoke and gas to the adhesive film present in the bonding region of the film web. It is, for example, suggested that the film be applied with interruptions or passages, using a profiled coating roller, which confers a screened structure to the screened layer. Another possibility is to perforate the applied adhesive film in a subsequent step by mechanical means, or to dissolve it away partially by chemical means. Furthermore, a number of chemical processes are proposed to impart a porous structure to the adhesive layer.

This known film web and the tubular casing produced from it comprise an adhesive layer which can only be given a porous structure with the aid of relatively complicated methods. Moreover, their permeability to smoke tends to be subject to variations. The seam region of sausage casings made of this film material has irregular coloration after smoking, and often also a structured appearance. A reduction of the seam strength at discrete points may also result, so that the seam of the tubular casing will tend to burst during stuffing. Another disadvantage arises because the known adhesive layers cannot be coated onto the whole surface of the web; this would lead to a substantial reduction of the permeability of the tubular casing to smoke and water vapor over its entire surface area.

SUMMARY OF THE INVENTION

It is therefore an object of the present invention to develop a smoke- and water vapor-permeable film of fiber-reinforced regenerated cellulose, which possesses a uniform permeability to smoke over its entire surface area, and which can be easily processed into tubular casings having seams running along their longitudinal axes. Such casings, produced of webs of film, would also exhibit excellent permeability to smoke over their entire surfaces.

It is another fundamental object of the invention to produce a film having a reduced permeability to water vapor, but having a permeability to water which is still considerably higher than the permeability of films used to produce sausage casings with a barrier layer for oxygen, water and water vapor.

Thus, it is the object of this invention to impart to the film or the tubular casing made thereof virtually contradictory properties, namely, good permeability to smoke, required for smoking sausages, and reduced permeability to water vapor.

Yet another object of the invention is to provide a film of fiber-reinforced regenerated cellulose, which is particularly suitable for producing tubular casings have sewn seams running along the longitudinal axis. To produce tubular casings of this type, it is customary to first fold the film about its longitudinal axis and then to sew together the edges extending in the direction of the longitudinal axis to form a tube. Threads puncturing the casing material exert a strong tensile stress on the film so that it must possess a very high resistance to tearing in order to avoid the tendency of tubular casings to tear at the puncture holes of the sewing seam.

In accomplishing the foregoing objects, there has been provided in accordance with the present invention a smoke permeable film suitable for the production of tubular casings, in particular sausage casings, comprising a film of fiber-reinforced regenerated cellulose; and a layer of a thermoplastic sealable resin, comprising a vinylidene group-containing copolymer, having a smoke-permeable structure and being anchored to the surface of said cellulose film with the aid of an adhesion promoting layer, wherein said resin layer completely coats at least one of the two surfaces of said cellulose film, and wherein said smoke-permeable structure comprises linear discontinuities running parallel to one another, wherein said discontinuities have lengths from about 5 to 1,000 $\mu$m, preferably from about 15 to 500 $\mu$m, widths of from about 2 to 15 $\mu$m, preferably of from about 5 to 12 $\mu$m, and depths of from about 3 to 15 $\mu$m, preferably of from about 5 to 10 $\mu$m.

In a preferred embodiment, one surface of said film is completely coated with a layer of said thermoplastic sealable resin having a smoke-permeable structure, and wherein said film possesses a permeability to water vapor of about 200 to 700 g/m$^2$·d, preferably 350 to 500 g/m$^2$·d (DIN 53 122).

In a further embodiment of the invention, both surfaces of said film are coated within a layer of said thermoplastic sealable resin having a smoke-permeable structure, and said film has a permeability to water vapor of about 100 to 600 g/m$^2$·d, preferably 200 to 300 g/m$^2$·d (DIN 53 122).

In another embodiment, said layer of thermoplastic sealable resin has a weight per unit area of about 3 to 15 g/m$^2$, preferably of 8 to 11 g/m$^2$.

Also disclosed is a tubular casing, in particular a sausage casing, with a seam running along it longitudinal axis comprising said smoke-permeable film, whereby said casing may be constructed such that the edges of said film mutually overlap and are either bonded by a sealed seam running along the longitudinal axis or sewn together by thread, or both.

In another embodiment, at least one film strip runs along the longitudinal axis of the tubular casing and is applied to the inner or outer surface for the purpose of bonding the edges of said film.

Also disclosed is a process for producing the film as disclosed, which comprises the steps of (a) coating a fiber web with viscose; (b) coagulating the viscose, while preventing shrinkage of the fiber web; (c) regenerating the coagulated viscose, whereby a cellulose hydrate gel is produced; (d) washing the film of cellulose hydrate gel; (e) partially drying the fiber-reinforced film of cellulose hydrate gel between said step c and subsequent step f until its water content is between 130 and 200% by weight, preferably between 140 and 180% by weight, relative to the weight of cellulose, while allowing the film to shrink in the transverse direction; (f) applying an aqueous dispersion containing sealable material to at least one surface of the film, wherein the solids content of said dispersion is at least 45% by weight, preferably 45 to 65% by weight, more preferably 50 to 60% by weight; and (g) drying the film while stretching the fiber web in the transverse direction, whereby the film of fiber-reinforced regenerated cellulose is formed.

Further objects, features and advantages of the present invention will become apparent from the detailed description of the preferred embodiments which follow.

DETAILED DESCRIPTION OF PREFERRED EMBODIMENTS

The special structure of the surface layer comprises two elements important in accomplishing the above-defined objects. Firstly, fine cracks in the $\mu$m range extend parallel to the machine direction, i.e., in the longitudinal direction of the film web. Secondly, the layer is comprised of a sealable material which substantially covers the whole surface of the film, except the discontinuities created by the fine cracks. The crack structure is present not only in the edges of the film, which are overlapped and sealed to form the longitudinal seam, but, rather, extends across the whole surface of the film. The dimensions of the linear cracks are defined above. The distance between relatively long cracks, i.e., cracks having a length of more than about 300 $\mu$m, is about 40 to 80 $\mu$m; the mean distance value is about 60 $\mu$m.

In spite of the layer of thermoplastic material, which is present on the entire surface of the film and is known for its high degree of impermeability to smoke and water vapor, if applied as a continuous film, the entire surface area of the film shows an excellent permeability to the kind of smoke used to smoke sausages and an increased permeability to water vapor. The sealed seam exhibits a high mechanical strength when a tubular casing is formed from the film by folding the latter about its longitudinal axis and sealing its lateral edges and when the resulting casing is subjected to mechanical and thermal strain.

The water vapor permeability of a film coated on one side with the surface layer according to this invention is from about 200 g/$m^2$·d to 700 g/$m^2$·d, preferably from about 350 g/$m^2$·d to 500 g/$m^2$·d; the permeability of a film coated on both sides with the superficial layer is from about 100 g/$m^2$·d to 600 g/$m^2$·d, preferably from about 200 g/$m^2$·d to 300 g/$m^2$·d, determined gravimetrically at a temperature of 23° C.±1° C. and a relative humidity of 85%±2% (DIN 53 122). Thus, the values measured for the permeability to water vapor are considerably higher than in the case of a film comprised of the same base film which is coated with a non-interrupted superficial film of a thermoplastic resin. In particular, if the resin is a vinylidene group-containing copolymer, values of not more than about 0.5 g/$m^2$·d to 2 g/$m^2$·d can be obtained. The permeability to smoke of the film manifests itself in a completely homogeneous, typically reddish-brown coloration of the sausage meat when the sausages made using the tubular casings of this invention are smoked by means of a customary process. Despite the cracked structure of the sealable surface layer, the strength of the sealed seam of tubular casings produced from the film of the invention is higher than the mechanical strength of the base material of fiber-reinforced regenerated cellulose. The high strength of the sealed seam is of particular importance during sausage production where the seam is exposed to hot water or smoking gases for a prolonged time during the cooking or smoking of the sausages, and where the seam must withstand high mechanical loads, tensions and deformations during stuffing, twisting-off, tying, clipping, etc. The film is also very well-suited to produce tubular casings having a sewn longitudinal seam, because it has a considerably reduced tendency to tear in the area of the punctures.

These advantageous properties make the film particularly suitable for the production of sausage casings for smokable emulsion-type sausages and dry sausages.

The base support material of the film is fiber-reinforced cellulose (transparent cellulose film, regenerated cellulose, or cellulose hydrate), which has been produced as a fiber-reinforced cellulose web by the viscose process (See, e.g., European Patent Application No. 58,240).

The fiber-reinforcement is in the form of a web, for example, a paper web and is usually composed of fibers such as are used in the manufacture of paper or rice paper; or of natural fibers, such as hemp fibers or flax fibers; or of synthetic fibers, such as polyamide fibers, polyester fibers or polyacrylonitrile fibers.

The fiber web is preferably treated on both sides with a viscose solution, preferably by immersion in a viscose solution or coating with a viscose solution using slot dies, rollers or spraying devices, for example. The viscose solution is then converted into regenerated cellulose.

It is also possible to incorporate from about 10 to 80% by weight of reinforcing fibers, having an average fiber length of about 0.05 to 15 mm for this purpose, into the viscose. The fibers are composed of synthetic organic fibers, of natural fibers, cotton fibers, for example, or of fibrids. The fiber-containing viscose is then extruded through a die into the coagulation bath, whereupon a gel web is formed.

The viscose solution is an alkaline solution of sodium cellulose-xanthate and is usually prepared by reacting the alkali cellulose, which has been obtained from cellulose and sodium hydroxide solution, with carbon disulfide in an alkaline medium. In most cases it contains about 4 to 20% by weight of cellulose. After ripening, the viscose is applied to the fiber web and spun, i.e., coagulated. The spinning bath contains, typically, about 20 to 80 g/l of sulfuric acid. It also contains about 80 to 150 g/l of sodium sulfate and/or about 150 to 300 g/l of ammonium sulfate.

In further stages, the fiber-reinforced web-like product comprising coagulated viscose is regenerated to cellulose hydrate gel in an acid medium, for example, in dilute (less than or equal to about 5% by weight) sulfuric acid. The cellulose hydrate gel is then washed with water to remove acid and salts, desulfurized, for example, with sodium sulfite solution and optionally passed through a bleaching bath. Finally, the gel is passed through a softening bath containing, for example, aqueous 5 to 20% strength glycerol, sorbitol or glucose solution.

Prior to the final conversion of the fiber-reinforced cellulose hydrate gel film into regenerated cellulose by intense drying at about 90° C. to 140° C. and to the optional adjustment to a water content of about 5 to 15% by weight by conditioning, the web is partly dehydrated in a subsequent step, after an optional treatment with a liquid containing an adhesion promoting agent, and coated with the substance forming the sealable layer. After drying, the fiber-reinforced film has a thickness of about 50 to 200 $\mu$m, corresponding to a weight per unit area of about 50 to 250 g/m$^2$.

An especially advantageous film is obtained when, as described in U.S. Pat. No. 4,396,039, the fiber web is held by the edges to prevent shrinking of the web during the coagulation of the viscose. The web may also be held optionally during the coating with viscose, during the regeneration, during the coating with an adhesion-promoting agent and/or during the coating with a sealable material.

An essential process step comprises allowing the web of cellulose hydrate gel to shrink during the partial dehydration prior to coating the web with the sealable material, and then additionally stretching it in the transverse direction by about 1 to 15%, in particular by about 3 to 12%, relative to the original width of the fiber web, during the final drying process. The slight shrinkage which occurs in the transverse direction during the partial dehydration is thus at least compensated for. After the web is coated with a sealable material and prior to stretching during the final drying process, the web may be predried, if necessary, to remove most of the water until the gel web has a water content of about 80 to 150% by weight. This process step is also described in U.S. Pat. No. 4,396,039.

Strength of the web in the longitudinal and transverse directions is achieved by the shrinkage-preventing measures, particularly during coagulation, and by the transverse stretching during the final drying process. This strength is essential for the manufacture of a tubular casing with a glued seam, and for the film strip composed of the same material to be used for bonding the edge zones of the web. The values which can be reached for the tensile strength and elongation at break are also given in U.S. Pat. No. 4,396,039. The values measured in the transverse direction can be inferior to those measured in the longitudinal direction of the web.

In accordance with this invention, immediately before the application of the substance forming the sealable layer to the fiber-reinforced film web of regenerated, but not yet dried cellulose, i.e., of cellulose hydrate gel, it is essential to the process that the water content of the film web, which is relatively high and usually amounts to about 240 to 300% by weight, relative to the weight of the cellulose, is reduced to values of between about 130 and 200% by weight, especially between about 140 and 180% by weight. During this intermediate stage, called partial dehydration, the film web is allowed to shrink in the direction perpendicular to the machine direction by not holding the film web at its edges during this pre-drying stage. The heat required to perform the partial dehydration is supplied to the film web by known means, e.g., hot air or radiators.

It is another important feature of this invention that the substance forming the sealable layer is applied to the partially dehydrated fiber-reinforced film web of cellulose hydrate gel in the form of a highly concentrated aqueous dispersion having a solids content of at least about 45% by weight, preferably between about 45 and 65% by weight, and most preferably between 50 and 60% by weight. Single-sided coating of the film web with the dispersion is, for example, performed by means of a wire bar. Any other metering coating device which is suitable for the continuous coating of moving webs and permits a short contact time (0.1 s to 2 s) between the dispersion stock and the film web can likewise be used. Double-sided coating is, for example, performed by means of an immersion process with a very short immersion time (0.1 to 2 seconds), by means of a roller coating system or by a combined roller and wire bar coating system. Depending on the respective surface to be coated, the coating weight varies between about 3 and 15 g/m$^2$, in particular between about 8 and 11 g/m$^2$.

It has been shown that relatively wide cracks form in the sealable surface layer when, in this intermediate stage, the water content of the cellulose hydrate gel film is reduced to values of less than 130% by weight, or the concentration of the liquid which contains the sealable resin is lower than the above-stated minimum concentration. By choosing values lower than these minimum values, the permeability to smoke of the film is not considerably improved, whereas the permeability to water vapor of the resulting film becomes too high. Undesirable permeability values of more than 700 g/m$^2$·d are thus reached.

On the other hand, the desired permeability to smoke is not achieved when the water content of the cellulose hydrate gel film is reduced to a value of more than 200% by weight in the intermediate step. The shrinkage of the film in the transverse direction during the partial dehydration is also important in accomplishing the object of the invention; the shrink value need not be high and depends on the quantity of water given off.

As is known, adhesion promoters for adhesives are to be understood as substances or mixtures of substances, which are applied to one or to both of the gluing surfaces before applying the adhesive, in order to improve the adhesion between the adhesive and the gluing surfaces. In the present case, the adhesion promoter is used to anchor the sealable surface layer to the film or film strip in a wet-resistant manner, if necessary. If is especially employed in cases where a high mechanical strength of the sealed seam is to be achieved. It is located between the sealable layer and the film and, if required, between the sealable layer and the film strip. Preferably, the adhesion promoter is a water-insoluble, cured, cationic resin. Polyurethane resins, nitrocellulose and other compounds known as water-insoluble anchoring agents can also be used.

Although, in principle, the adhesion-promoting layer of resin would only have to be present in the region of the surfaces of the film web to be glued, it it is advisable for technical reasons, to apply one or two different adhesion promoting layers to the entire area of one surface and even to both surfaces of the web provided there is an adequate permeability to smoke.

In the manufacture of the fiber-reinforced film of cellulose hydrate, the dispersion containing the adhesion promotor is coated onto the regenerated, but not yet dried web of cellulose hydrate gel. This coating can be effected prior to, simultaneously with or subsequently to the treatment of the gel web with a plasticizer, such as a polyol. For this purpose, the fiber-reinforced film of cellulose hydrate gel is coated, prior to the application of the sealable material, with an aqueous solution containing up to 25% by weight of a dispersible adhesion promotor, in particular a thermosetting cationic resin. In the course of the subsequent drying stages, the resin is cured to its water-insoluble form and is permanently bonded to the film surface.

The layer of adhesion-promoting resin has a weight per unit area of about 30 to 300 mg/m$^2$, preferably of about 40 to 75 mg/m$^2$.

Examples of suitable cationic thermosetting resins and of suitable solvents and possible additives are given in U.S. Pat. No. 4,396,039, the entire disclosure of which is incorporated by reference herein.

Particularly preferred cationic thermosetting resins are condensation products of polyamide-polyamines, or aliphatic polyamines, or of polyamides with bifunctional halohydrins, or derivatives thereof. These are also described in detail as suitable materials for the anchoring layer in U.S. Pat. No. 4,396,039.

The permeation properties of the film are practically not affected by the anchoring layer. This property is of particular importance for the permeability to water vapor and smoking fumes, because the film is used for smoked dry sausages or smoked emulsion-type sausages. If the permeability were too low, for example, the typical reddish-brown color shade of smoked sausage meat would not be obtained.

After the application of the dispersion of adhesion promoter, the water content of the film of cellulose hydrate gel is reduced to about 130 to 200% by weight, relative to the weight of the cellulose, as described above. During this partial dehydration the cationic resin is partly cured by the action of heat. The highly concentrated liquid containing the sealable substance is then applied to the film, and the dispersing agent or solvent for the sealable material is removed in the final drying stage. In this last drying stage, the film is usually dried until its moisture content is less than about 15% by weight, preferably from about 5 to 10% by weight. A coating thickness of the sealable layer of about 0.005 to 0.05 mm is generally sufficient, the preferred thickness being between about 5 and 25 $\mu$m, most preferably between about 5 and 15 $\mu$m.

Like the adhesion-promoting resin, the sealable superficial layer is applied over the entire film surface and not only in the desired gluing region. One or both of the surfaces of the film are entirely coated with the heat-sealable adhesive, i.e., an adhesive which for the purpose of sealing is thermally activated. During the manufacture of the film from viscose, the adhesive is applied to at least one surface of the web, as a solution, dispersion or emulsion in water. The set, solvent-free layer should not be tacky, but should melt only during sealing as a result of the heat supplied and should solidify again upon cooling down. The raw materials used are aqueous dispersions of copolymers of vinyl chloride or vinylidene chloride, with additional resins and other polymers. Copolymers of vinyl acetate and polymethacrylates, polyurethanes and polyesters, in particular ethylene/vinyl acetate copolymers, vinyl acetate/vinyl chloride copolymers, polyamides and polyethylene may also be used.

The particular sealable thermoplastic material employed is a vinylidene resin which is usually applied with a weight per unit area of from about 3 to 15 g/m$^2$. By the process of this invention, a special, smoke-permeable structure is imparted to the continuous coatings formed by these resins, which are generally impermeable to water vapor and smoke. Suitable resins are obtained by copolymerization of monomers, of which at least one component contains a vinylidene group.

In general, vinylidene resins can be used which contain at least about 5% by weight, but preferably no less than about 80% by weight, of vinylidene chloride in the polymerized molecule. The following non-exclusive list of examples may be mentioned as co-monomers: vinyl chloride, vinyl bromide, vinyl acetate, vinyl propionate, vinyl chloroacetate, alkyl acrylate or methacrylate, such as, for example, the methyl, ethyl, propyl, butyl, isobutyl, methoxyethyl or chloroethyl acrylates or methacrylates, methyl vinyl ketone, methyl isopropenyl ketone, acrylonitrile, methacrylonitrile, styrene, vinylnaphthalene, ethyl vinyl ether, butyl vinyl ether, N-vinylphthalimide, N-vinylsuccinimide, N-vinylcarbazole, methylene diethyl malonate, unsaturated organic acids, such as itaconic acid, or mixtures of these compounds. In addition to vinylidene chloride, the copolymer can contain one to three of these monomers.

These sealable layers can also contain known waxes, for example, those based on esterified montanic acids, polyolefin waxes or those based on oxazoline. In addition to, or instead of waxes, they may contain customary fillers, for example, kaolin (in particular, kaolin which has been rendered hydrophobic), silica or calcium carbonate (chalk) having a preferred mean grain size of about 1 to 3 $\mu$m.

Moreover, the usual additions of plasticizers, for example, esters of phthalic acid, such as dibutyl phthalate, esters of citric acid, such as tributyl acetylcitrate, of sebacic acid or of tartaric acid, such as diisobutyl tartrate, are used.

It has been found that the sealable surface layer, applied in accordance with this invention, ensures a satisfactory permeability to smoke. After smoking, tubular casings, which are stuffed with sausage meat and which are made of the fiber-reinforced film of regenerated cellulose according to this invention, show a perfect and uniform smokey color in the region of the sealed seam. Therefore, no special measures need to be taken to improve the permeability to smoke. Surprisingly, the described embodiments of the tubular casing having improved permeability to smoke possess a sufficient stability and mechanical and thermal strength in the gluing region.

It is known to form a tubular casing possessing one or several seams which run along the longitudinal axis by gluing the edges of the edge regions running along the longitudinal axis of a film web, for example. Reference is made to the above-mentioned publication U.S. Pat. No. 4,396,039.

In accordance with the instant invention, the tubular casing is formed from a sheet-like or web-like, rectangular cut piece of film or continuous film which is curved about its longitudinal axis, by overlapping and bonding the edges running parallel to the longitudinal axis. The casing then has a sewn or sealed seam running along its longitudinal axis. It is also possible to bond the edges to one another by bringing them together flush, i.e., with the margins at least essentially abutting, and then bonding them by means of a tape or strip of film, generally referred to as "film strip", which covers the two edge zones. The film strip is then on the outside or inside of the tubular casing. Film strips running mutually parallel may also be used, of which one is then located on the inside and one is located on the outside of the tubular casing. A film strip can also be used when the edges overlap. Before the bonding seam is produced, the sealable layer covers the entire surface of the web, preferably also the surface of the film strip.

If the seam is covered by the film strip, the sealable layer is applied to at least the surface of the film which is directed toward the film strip. The other surface of the film, which does not require a sealable layer and therefore usually remains uncoated is coated with an adhesion promoter. This other surface may be coated with a completely different material, in addition to or in lieu of adhesion promoter, by which ease of peeling of the tubular casing used as a sausage casing is improved. If, however, an overlapped seam is formed where the inside and the outside of the film overlap (see FIG. 1 of European Patent Application No. 37,543), a film which is coated with a sealable layer on both surfaces is preferable so that the sealing layers are sealed against each other. For some applications it is sufficient to coat one surface of the film with the sealable layer anchored by means of an adhesion promoter, whereas the other surface just carries a coating of adhesion promoter. In order to produce the overlapped seam, in such a case, the sealing layer is sealed against the layer of adhesion promoter.

The film strip properly has a width of from about 5 to 15% of the tube circumference and preferably consists of the same material as the tubular casing, i.e., smoke-permeable fiber-reinforced cellulose hydrate, the strength parameters of which are the same in the longitudinal and transverse directions.

This compact film strip is made of a smoke-permeable material and therefore no additional measures, such as providing pores or perforations, are required to create a smoke-permeable structure.

Since the tubular casing is intended for use as a packaging casing for foodstuffs to be smoked, care has to be taken to ensure a sufficient permeability to smoke of the film strip, which is achieved by the above-described means.

The film web is formed in the shape of a tube, for example, either on a sufficiently long path, so that distortion and formation of folds do not occur, or by deflection over a shoulder-like forming tool (European Patent Application No. 58,240). The two lateral edges of the web are adjacent, substantially without a spacing, or they overlap. By means of transport elements gripping around the tube circumference, the tube is moved over the surface of a support body located in its interior. Before the seam is closed, the film strip is introduced between the surface of the support body and the abutting edges of the web, preferably with its tacky layer facing the direction of the inner surface of the tube, such that the butt seam formed by the edges of the web forms the center line of the film strip covering both edges to substantially the same width. The movement of the web and the sealing or sewing of the edges can take place cyclically or continuously.

The sealing is effected by contact with a sealing jaw or a sealing roller preheated to a predetermined temperature. Any other heat source may also be used for the sealing, e.g., infrared radiators, high-frequency heating or hot air.

It is often also advisable to exert pressure on the sealing area by means of heated pressure roller, for example. The applied sealing temperatures and pressures largely depend on the material properties of the layers which are to be sealed. In practice, preference will be given to those sealable layers which, within a temperature range of from about 120° C. to 150° C., will produce sealed seams which are capable of withstanding the stresses occurring during practical use.

If a film strip is used to join the edges of the web running along the longitudinal axis, said strip is pressed with the adhesive layer pointing toward the edges it seals. In another variant, the film strip is also made of a material which is suitable for sealing, i.e., a sealable thermoplastic material so that the step of coating the film strip with a sealable superficial layer can be omitted.

It is also possible to use a smoke-permeable film strip, especially of fiber-reinforced cellulose hydrate, with a sealable layer on both surfaces. One of the two sealable surfaces of this film strip is entirely glued, in the direction of the longitudinal axis, to one of the two edge zones of the film web which run in that direction. The tube is then shaped, with the film strip in the overlap between the two longitudinal edges. Thereafter, the second sealable surface of the film strip is sealed to the second edge of the film. For packaging meat products such as sausage meat, known shirred tubular casings are used which progressively unfold as the sausage composition is forced in. These shirred casings have hitherto been manufactured from long tubes which are conveyed in the direction of their longitudinal axis and are shirred against an opposing force, the length of shirred casing usually being only about 1 to 3% of the original unshirred length.

The tubular casing according to this invention can also be shirred. Shirring is performed, for example, by means of the apparatus known from U.S. Pat. No. 3,988,804. A shirring ratio of 1:70 to 1:80 can readily be achieved. A helical twisting of the casing and consequently, twisting of the relatively thick seam zone about the longitudinal axis of the casing during the shirring process are also possible, but not necessary. This is effected, for example, by shirring devices known, per se, such as described, for example, in U.S. Pat. No. 2,819,488; U.S. Pat. No. 3,619,854; U.S. Pat. No. 3,594,857 and U.S. Pat. No. 3,766,603.

If, for example, the tubular casing is envisaged for sensitive foodstuffs, the web or the tubular casing is sterilized by the usual methods.

The flavor of the sausage meat is not affected when the casing is used as a sausage casing. The sausage casing and the sealed seam exhibit high resistance to elongation stresses and volume stability during filling with sausage composition, handling and processing. Surprisingly, the pressure arising on filling and the swelling and shrinking forces arising on cooking and cooling, do not cause any damage to the seam, although the sealing layer is formed with interruptions. The sausage casing can also be stored at low temperature and can easily be cut open, it being possible to use the film strip as a tear-open tab. Due to the fact that the tubular casings of this invention possess a reduced permeability to water vapor, compared to uncoated films of fiber-reinforced regenerated cellulose, the loss of water of emulsion-type sausages with a casing of the film material of this invention is reduced by about 30% to 40%, measured after a storing period of one week.

By means of the non-limiting Example which follows the invention will be explained in greater detail.

EXAMPLE

The film is produced as shown in FIG. 1 of U.S. Pat. No. 4,396,039, the substantial process steps of the instant invention being performed between the baths (8) and the drying section (10). A web of long-fibered hemp paper with a flattened width of 235 mm and a weight per unit area of 21 g/m$^2$ is coated on both sides with viscose. For example, the gap width is 0.8 mm, and the web speed is 5 m/min. Regeneration liquid is then applied to the web provided with viscose, for the purpose of precipitation, i.e., coagulation, and regeneration. The web width is kept constant by means of needle chains engaging on the two edges of the web, so that shrinkage in the transverse direction, which usually occurs on regeneration, is prevented. The fiber-reinforced film web of cellulose hydrate gel is then passed through washing, desulfurization and plasticizing baths. The last bath through which the film of cellulose hydrate gel is passed contains a 1% by weight strength aqueous solution of an adhesion promoter which is based on a cationic resin representing a reaction product of ethylene diamine, adipic acid, diethylene triamine and epichlorohydrin (Resamin HW 601, made by Cassella). The film is coated with this solution on both sides. Upon leaving this bath, the film of cellulose hydrate gel has a width of 210 mm and a water content of 250% by weight.

As a result of the subsequent partial dehydration of the film web, for which the web is conveyed over heated rollers having a surface temperature of from 70° C. to 80° C., the film shrinks to a width of 208 mm and its water content is reduced to 160% by weight. After this intermediate stage, the web of film is transported to a coating applicance as described in DE-C No. 26 11 625. The metering device employed is a wire bar with a wire thickness of 150 μm. The applied layer has a wet film thickness of 16 μm.

The coating material is an aqueous polymer dispersion of a carboxyl group-containing copolymer which comprises a predominant portion of vinylidene chloride units and minor amounts of acrylonitrile units and other polymerizable compounds and has a solids content of 55% (DIOFAN 208 D, made by BASF).

The predrying stage in the first drying station (10), which is shown in FIG. 1 of U.S. Pat. No. 4,396,039, is omitted. The edges of the web which carries the coating of the copolymer dispersion are then gripped by needle clip chains, and the web is conveyed, in a tenter frame, through a number of decks of a drying field. When entering the tenter frame, the film is stretched in the transverse direction to a width of 218 mm to 220 mm and is then dried, preferably at about 130° C., while it is still held at this width. The resulting film has a residual moisture content of about 7%, a tensile strength of 74 N/mm$^2$ in the longitudinal direction and of 64 N/mm$^2$ in the transverse direction, and an elongation at break of about 9% in the longitudinal direction and of about 24% in the transverse direction (DIN 53 455).

The PVDC layer prepared in accordance with this Example has a thickness of 7-9 82 m, corresponding to a weight per unit area of 10 g/m$^2$. It is not a continuous film, but, seen in the machine direction, it possesses a plurality of parallel, linear cracks which have lengths of between about 15 and 500 μm, widths of between about 8 and 12 μm and a mean mutual distance of about 60 μm. For the distance measurement, only relatively long cracks, i.e., cracks which are longer than about 300 μm, are considered.

As described with reference to FIGS. 3, 4 or 7 of U.S. Pat. No. 4,396,039, a tubing is then formed of the film web coated with an anchoring layer and a sealable layer.

It is also possible to carry out the tube formation and the sausage production in one stage by shaping the film into a tubular casing at the stuffing horn of a stuffing machine and simultaneously forcing sausage meat into the casing.

What is claimed is:

1. A smoke-permeable film suitable for the production of tubular casings, in particular sausage casings, comprising:
   a. a film of fiber-reinforced regenerated cellulose; and
   b. a layer of a thermoplastic sealable resin, comprising a vinylidene group-containing copolymer having a smoke-permeable structure and being anchored to the surface of said cellulose film with the aid of an adhesion promoting layer, wherein said resin layer completely coats at least one of the two surfaces of said cellulose film, and wherein said smoke-permeable structure comprises linear discontinuities running parallel to one another, wherein said discontinuities have lengths of from about 5 to 1000 μm, widths of from about 2 to 15 μm, and depths of from about 3 to 15 μm.

2. A smoke-permeable film as defined by claim 1, wherein said discontinuities have lengths of from about 15 to 500 μm, widths of from about 5 to 12 μm, and depths of from about 5 to 10 μm.

3. A smoke-permeable film as defined by claim 1, wherein one surface of said film is completely coated with a layer of said thermoplastics sealable resin having a smoke-permeable structure, and wherein said film possesses a permeability to water vapor of from about 200 to 700 g/m$^2$·d.

4. A smoke-permeable film as defined by claim 3, wherein said film possesses a permeability to water vapor of from about 350 to 500 g/m$^2$·d.

5. A smoke-permeable film as defined by claim 1, wherein both surfaces of said film are coated with a layer of said thermoplastic sealable resin having a smoke-permeable structure, and wherein said film has a permeability to water vapor of from about 100 to 600 g/m$^2$·d.

6. A smoke-permeable film as defined by claim 5, wherein said film has a permeability to water vapor of from about 200 to 300 g/m$^2$·d.

7. A smoke-permeable film as defined by claim 1, wherein said layer of thermoplastic sealable resin has a weight per unit area of from about 3 to 15 g/m$^2$.

8. A smoke-permeable film as defined by claim 1, wherein said layer of thermoplastic sealable resin has a weight per unit area of from about 8 to 11 g/m$^2$.

9. A tubular casing, in particular a sausage casing, with a seam running along its longitudinal axis, comprising said smoke-permeable film as disclosed in claim 1.

10. A tubular casing as disclosed in claim 9, wherein the edges of said film mutually overlap and are bonded by a sealed seam running along the longitudinal axis.

11. A tubular casing as disclosed in claim 9, wherein the edges of said film mutually overlap and are sewn together by thread.

12. A tubular casing as disclosed in claim 9, wherein the edges of said film mutually overlap and are both bonded by a sealed seam running along the longitudinal axis and sewn together by thread.

13. A tubular casing as disclosed in claim 9, wherein at least one film strip runs along the longitudinal axis and is applied to the inner or outer surface of the tubular casing for the purpose of bonding the edges of said film.

14. A tubular casing, in particular a sausage casing, with a seam running along its longitudinal axis, comprising said smoke-permeable film as disclosed in claim 5.

15. A tubular casing as disclosed in claim 14, wherein the edges of said film mutually overlap and are bonded by a sealed seam running along the longitudinal axis.

16. A tubular casing as disclosed in claim 14, wherein the edges of said film mutually overlap and are sewn together by thread.

17. A tubular casing as disclosed in claim 14, wherein the edges of said film mutually overlap and are both bonded by a sealed seam running along the longitudinal axis and sewn together by thread.

18. A tubular casing as disclosed in claim 14, wherein at least one film strip runs along the longitudinal axis and is applied to the inner or outer surface of the tubular casing for the purpose of bonding the edges of said film.

19. A process for producing the film as disclosed in claim 1, which comprises the steps of
 (a) coating the fiber web with viscose;
 (b) coagulating the viscose, while preventing shrinkage of the fiber web;
 (c) regenerating the coagulated viscose, whereby a cellulose hydrate gel is produced;
 (d) washing the film of cellulose hydrate gel;
 (e) partially drying the fiber-reinforced film of cellulose hydrate gel between said step c and subsequent step f until its water content is between about 130 and 200% by weight relative to the weight of cellulose, while allowing the film to shrink in the transverse direction;
 (f) applying an aqueous dispersion containing sealable material to completely coat at least one surface of the film, wherein the solids content of said dispersion is at least about 45% by weight; and
 (g) drying the film while stretching the fiber web in the transverse direction, whereby the film of fiber-reinforced regenerated cellulose is formed.

20. A process as claimed in claim 19, wherein the water content of step e is between about 140 and 180% by weight relative to the weight of cellulose.

21. A process as claimed in claim 19, wherein the solids content of the dispersion of step f is between 45 and 65% by weight.

22. A process as claimed in claim 19, wherein the solids content of the dispersion of step f is between 50 and 60% by weight.

23. A process as claimed in claim 19, wherein the quantity of water absorbed by the film from the dispersion is smaller than the quantity of water removed from the film during the preceding drying.

24. A process according to claim 23, wherein the quantity of water absorbed by the film from the dispersion during the coating step is adjusted by varying the solids content of the dispersion.

25. A process according to claim 23, wherein the quantity of water absorbed by the film from the dispersion during the coating step is adjusted by varying the time during which the dispersion is allowed to act upon the film.

26. A process according to claim 23, wherein the quantity of water absorbed by the film from the dispersion during the coating step is adjusted by both varying the solids content of the dispersion and varying the time during which the dispersion is allowed to act upont the film.

27. A process as claimed in claim 19, further comprising the step of applying a liquid which contains an adhesion promoter to the film of cellulose hydrate gel prior to drying the latter down to a water content of from about 130 to 200% by weight.

28. A process as claimed in claim 19, further comprising the step of applying a liquid which contains an adhesion promoter to the film of cellulose hydrate gel prior to drying the latter down to a water content of from about 140 to 180% by weight.

29. A process as claimed in claim 23, further comprising the step of applying a liquid which contains an adhesion promoter to the film of cellulose hydrate gel prior to drying the latter down to a water content of from about 130 to 200% by weight.

30. A process as claimed in claim 23, further comprising the step of applying a liquid which contains an adhesion promoter to the film of cellulose hydrate gel prior to drying the latter down to a water content of from about 140 to 180% by weight.

31. A process as claimed in claim 24, further comprising the step of applying a liquid which contains an adhesion promoter to the film of cellulose hydrate gel prior to drying the latter down to a water content of from about 130 to 200% by weight.

32. A process as claimed in claim 24, further comprising the step of applying a liquid which contains an adhesion promoter to the film of cellulose hydrate gel prior to drying the latter down to a water content of from about 140 to 180% by weight.

33. A process as claimed in claim 25, further comprising the step of applying a liquid which contains an adhesion promoter to the film of cellulose hydrate gel prior to drying the latter down to a water content of from about 130 to 200% by weight.

34. A process as claimed in claim 25, further comprising the step of applying a liquid which contains an adhesion promoter to the film of cellulose hydrate gel prior to drying the latter down to a water content of from about 140 to 180% by weight.

35. A process as claimed in claim 26, further comprising the step of applying a liquid which contains an adhesion promoter to the film of cellulose hydrate gel prior to drying the latter down to a water content of from about 130 to 200% by weight.

36. A process as claimed in claim 26, further comprising the step of applying a liquid which contains an adhesion promoter to the film of cellulose hydrate gel prior to drying the latter down to a water content of from about 140 to 180% by weight.

* * * * *